April 24, 1945.  H. Z. STEWART  2,374,466
MACHINE FOR SHELLING PEAS AND BEANS
Filed Aug. 10, 1944   2 Sheets-Sheet 1

INVENTOR.
Horace Z. Stewart
BY
Hull & West
ATTORNEYS

April 24, 1945.  H. Z. STEWART  2,374,466

MACHINE FOR SHELLING PEAS AND BEANS

Filed Aug. 10, 1944  2 Sheets-Sheet 2

INVENTOR.
Horace Z. Stewart
BY
Hull & West
ATTORNEYS

Patented Apr. 24, 1945

2,374,466

UNITED STATES PATENT OFFICE 2,374,466

MACHINE FOR SHELLING PEAS AND BEANS

Horace Zell Stewart, Mobile, Ala.

Application August 10, 1944, Serial No. 548,869

10 Claims. (Cl. 130—30)

This invention relates to machines for shelling peas and beans and has for its general object to produce a machine for the purpose described which will enable peas and beans to be removed without injury from their pods; to enable this result to be accomplished both efficiently and expeditiously; and to enable this result to be accomplished through simple and inexpensive mechanism. While susceptible of a wider range of application, the machine shown herein is particularly useful in connection with the shelling of tough-podded and elongated peas or beans, an instance of such being the "black-eyed pea" or cowpea.

In the practice of my invention, the pea or bean is inserted with the sutures in a substantially vertical plane and between upper and lower pairs of feed rolls, the receiving rolls having surfaces which conform more or less to what, for convenience of description, will be referred to hereinafter as the "top" and "bottom" surfaces of the pod and are driven by these rolls so that the placenta will be brought into engagement with a knife which serves to split the pod along the placenta but without injuring the fruit attached thereto and, by further movement of which rolls, the separated edges of the pod are progressively spread apart as the pea or bean is fed by the rolls, the fruit being removed from the pod and being conducted to a suitable collecting receptacle, as shown herein.

Figure 1:
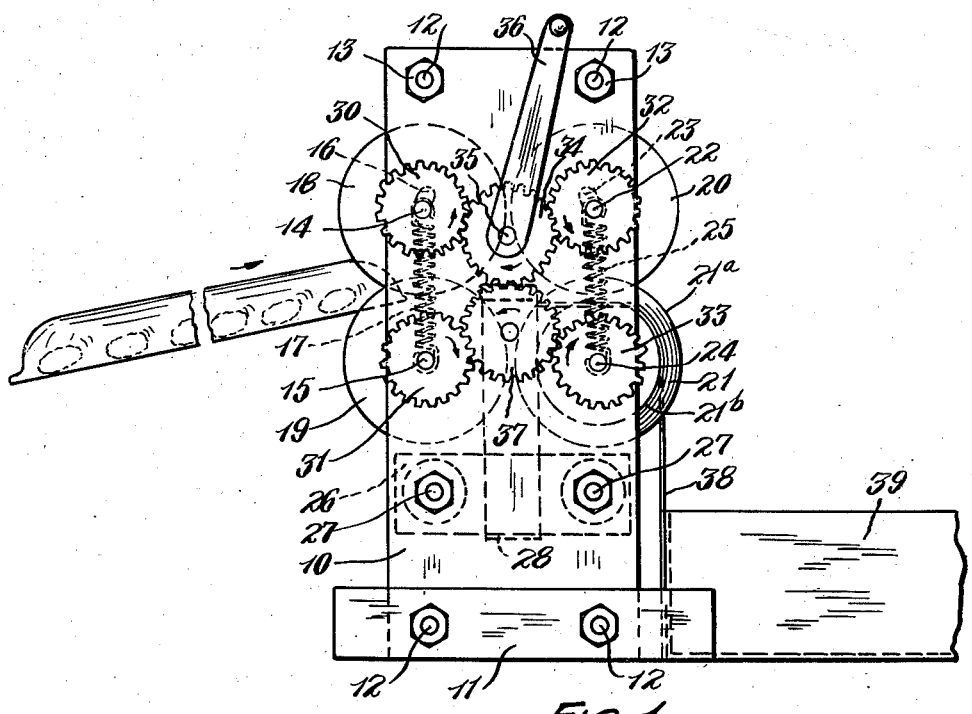
Figure 4:
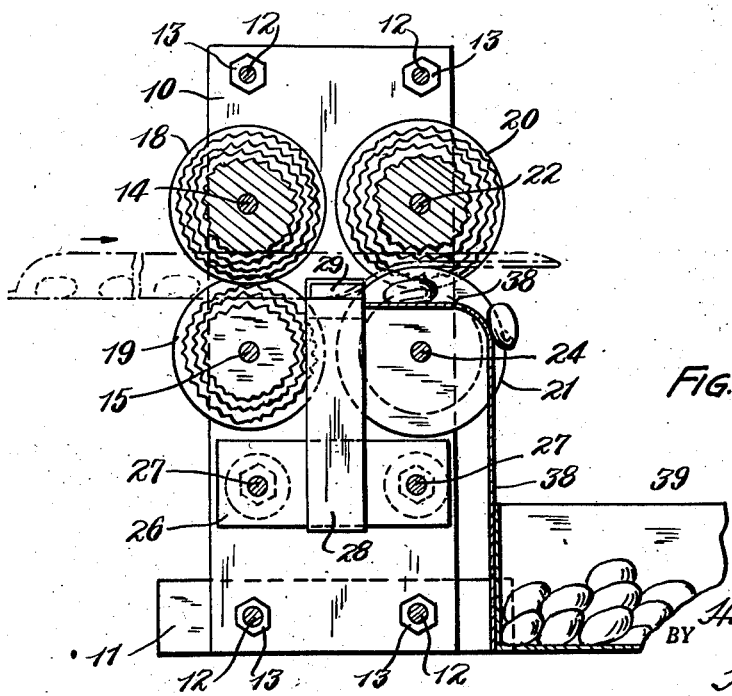
Figure 2:
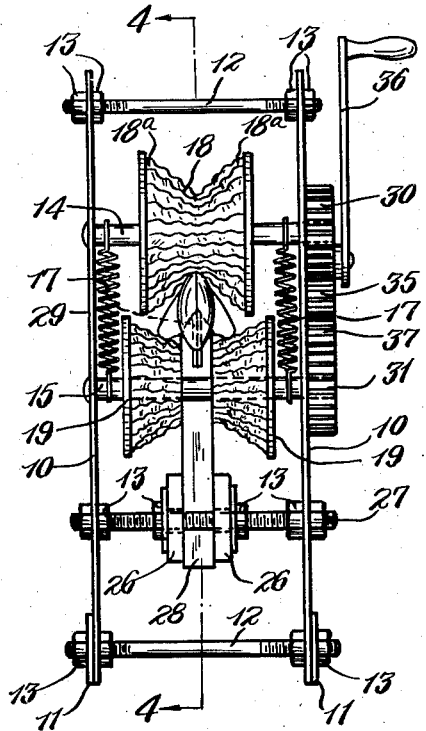
Figure 3:
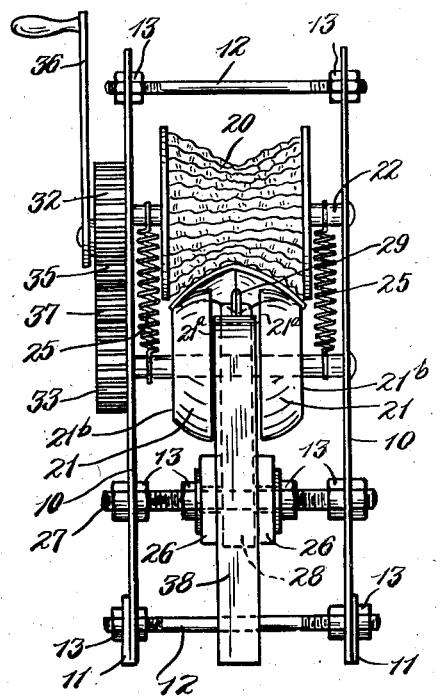

A construction of machine for realizing the objects of my invention is shown in the drawings hereof, wherein Fig. 1 represents a side elevation of such machine, showing an elongated pea or bean being inserted between the receiving feed rolls; Fig. 2 is a front elevational view, and Fig. 3 a rear elevational view, of the machine shown in Fig. 1; Fig. 4 a sectional view taken on the line 4—4 of Fig. 2; and Fig. 5 a detail in elevation illustrating the manner in which a pea or bean introduced into my machine is slit along the lower center by a knife and the manner in which the sides, after this splitting operation, are spread apart upwardly, thereby to assist in freeing the fruit.

Describing, by reference characters, the parts shown in the aforesaid drawings, 10 denotes opposed side members of my machine, the same being shown as secured to extended base supports 11 and connected by bolts 12 having adjusting nuts 13 thereon. Mounted in what will be referred to hereinafter as the "front" of the side members are upper and lower shafts 14 and 15, the shaft 14 being journaled in slotted guides 16, and the said shafts being connected adjacent to their ends by coiled springs 17. These shafts support the initial or receiving feed drive rolls 18 and 19 respectively.

The roll 18 is outwardly concave from the opposite ends 18ª toward the middle whereby its outer surface approximates that of an annular trough, the operating surface of the roll being roughened to facilitate its feeding action. The lower roll 19 is made up of two sections each diminishing in width or diameter from its exterior toward its interior, a space being provided between the inner ends of said sections.

20 denotes generally an upper delivery drive roll which is also outwardly concave from its opposite ends toward the middle thereof, the concavity however being less than is the case with the concavity of the roll 18. The concave operating surface is roughened or provided with short sharp projections as is the case with the rolls 18 and 19.

Cooperating with the roll 20 is a lower delivery drive roll comprising sections 21, the outer surface of each of which sections diminishes progressively in diameter from the internal face 21ª to the external face 21ᵇ thereof. It will be noted that the outwardly convex surfaces of the roll sections 21 are substantially complementary to the opposed concave surfaces of the rolls 20 thereabove. As the roll sections 21 are intended to form a support for the separated sides of the pod after the placenta shall have been severed, the external surfaces of these sections are not roughened.

The roll 20 is mounted upon a shaft 22, the ends of which are journaled in slotted guides 23 in the side members 10, and the roll sections 21 are mounted upon a shaft 24, the ends of which are journaled in the side members 10. Coiled spring 25 connects the end portions of the shafts 22 and 24.

26 denotes a pair of clamping members which are adjustably mounted upon bolts 27 the ends of which are supported by the side members 10. 28 denotes a knife-support, the lower end of which is secured between the clamping members 26 and within the upper end of which the knife 29 is secured. In practice, this knife is positioned so that it projects a sufficient distance upwardly above the axial center of the lower receiving drive roll and into the space between the rolls 19 and 21 to enable it to cut through the placenta of a pea or bean, which is inserted between these rolls, in the manner indicated in Fig. 4, but without severing the fruit which it detaches from the placenta. In practice, a discarded razor blade can be utilized as a knife. The manner of mounting the knife enables me to adjust it with the precision necessary to enable it to perform its function in an efficient manner.

The shafts 14 and 15 are provided each at an outer end thereof with a gear 30, 31, respectively, and the shafts 22 and 24 are provided at corresponding ends with gears 32 and 33, respectively. 34 denotes a gear mounted on a shaft 35, the said gear being located between the gears 30 and 32 and meshing therewith and the shaft 35 being provided with an operating arm or lever 36. 37 denotes a lower gear which is mounted intermediate of the gears 31 and 33 and which meshes therewith and with the gear 34.

Figure 5:
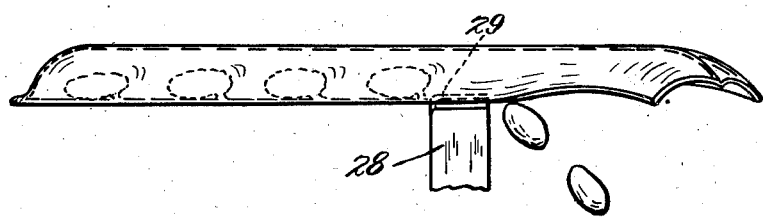

With the parts constructed and arranged as described, the operation will be as follows: One end of a pea or bean is inserted into the space provided between the rolls 18 and 19, with the placenta directed downwardly. The operator then rotates the gear 34 by means of the arm 36, which causes the rolls 18 and 19 to drive the pea or bean inwardly with the placenta in engagement with the knife 29, thereby slitting the pea or bean along its placenta. Further movement of the pea or bean causes the end portion of the pod which has been slit to pass between the rolls 20 and 21, the rolls serving not only to assist in driving the pea or bean through the machine, but the lower roll serving also to spread the sides of the pod apart about the upper suture as a hinge, as indicated in Fig. 5, and serving further to support successive portions of the sides of the pod in this outspread position while the sides are being grasped between the rolls 20 and 21 thereby preventing the knife from slicing the fruit. The fruit, having been dislodged from the pod, is conducted along a guide plate 38 which extends rearwardly from the knife support, through the radially inwardly extending channel formed between the sections 21 of the lower delivery roll, and thence downwardly, enabling the fruit to be moved along the said guide plate and discharged into a receptacle, indicated at 39.

The springs 17 and 25 serve to enable the upper and lower receiving and delivery drive rolls to be separated in the event that the pressure exerted between the upper and lower rolls should become excessive, as by inadvertent entry of a pebble or other foreign material therebetween.

From the foregoing, it will be noted that I have produced a machine which is capable of shelling peas or beans having elongated and tough pods and which is also capable of shelling peas or beans which vary greatly in length and which also may be misshapen. It will be evident further that I am enabled to accomplish this result with rapidity and efficiency.

Having thus described my invention, what I claim is:

1. In a machine of the character described, the combination of an upper and a lower receiving feed roll each having a concave surface intermediate of the ends thereof shaped to engage respectively the top and the bottom of the pod of a pea or bean inserted therebetween, an upper and a lower delivery feed roll spaced from the former feed rolls, a knife interposed and supported between the two pairs of rolls and adapted and arranged to slit the placenta of a pea or bean passing thereabove, the lower delivery feed roll having outwardly convex surfaces adapted to support and to spread apart the severed edges and the portions of the sides of the pod thereabove and the upper delivery feed roll having concave surfaces cooperating with the opposed surfaces of the roll therebelow in feeding the slotted pod, and means for driving the said rolls.

2. In the machine set forth in claim 1, the lower feed delivery roll having a radially inwardly extending channel at the center thereof, and a guide member for the fruit extending from the knife through said channel.

3. In a machine of the character described, the combination of an upper and a lower receiving feed roll each diminishing in diameter from the end portions thereof toward the central portion thereof, an upper and a lower delivery feed roll spaced from the former feed rolls, the upper delivery roll diminishing in diameter from the end portions toward the middle thereof and the lower delivery roll having surfaces substantially complementary in shape to the surfaces of the upper roll opposed thereto, the aforesaid surfaces of the lower delivery roll being spaced apart at their inner ends, thereby to provide a space between such inner ends for the passage of peas or beans, a knife interposed and supported between the two pairs of rolls and with its cutting portion projecting above the central recessed portion of the lower feed roll and in position to slit the placenta of a pea or bean fed by the aforesaid rolls, means for supporting said rolls for rotation, and means for driving the said rolls.

4. In a machine of the character described, the combination of opposed side members, an upper shaft and a lower shaft having their ends supported by the said side members, receiving feed rolls mounted on said shafts, the said rolls each diminishing in diameter from the end portions thereof toward the central portion thereof, an upper shaft and a lower shaft also having their ends supported by said side members and spaced laterally from the former shafts, a delivery feed roll on the upper of the last mentioned shafts and the outer surface whereof diminishes in diameter from the end portions thereof toward the central portion thereof, a delivery feed roll mounted on the lower of the last mentioned shafts and having outwardly convex surfaces substantially complementary in shape to the surfaces of the upper roll opposed thereto, a knife interposed and supported between the lower rolls, with its cutting portion above the central recessed portion of the lower receiving roll, and means for driving the said rolls.

5. In the machine set forth in claim 4, the ends of the upper shafts being mounted in slotted guides provided therefor by the side members, and coiled springs connecting the upper shafts with the shafts respectively therebelow.

6. In a machine of the character described, the combination of opposed side members, an upper shaft and a lower shaft having their ends supported by the said side members, receiving feed rolls mounted on said shafts, the said rolls each diminishing in diameter from the outer end portion thereof toward the central portion thereof, an upper shaft and a lower shaft also having their ends supported by said side members and spaced laterally from the former shafts, a delivery feed roll on the upper of the last mentioned shafts and the outer surface whereof diminishes in diameter from the end portions toward the center thereof, a delivery feed roll mounted on the lower of the last mentioned shafts and having outwardly convex surfaces substantially complementary in shape to the surfaces of the upper roll opposed thereto, a pair of laterally spaced bolts below said rolls and having their opposite ends supported by said side members, a pair of clamping members adjustably mounted on said bolts, a knife support having its lower portion interposed between and clamped by said clamping members and extending upwardly therefrom, a knife secured to the upper end of said knife support with its cutting portion between the lower rolls and above the recessed central portion of the lower receiving roll, and means for driving the said rolls.

7. In a machine of the character described, the combination of opposed side members, an upper shaft and a lower shaft having their ends supported by the said side members, receiving feed rolls mounted on said shafts, the said rolls each diminishing in diameter from the end portions thereof toward the central portion thereof, an upper shaft and a lower shaft also having their ends supported by said side members and spaced laterally from the former shafts, a delivery feed roll on the upper of the last mentioned shafts and the outer surface whereof diminishes in diameter from the end portions thereof toward the central portion thereof, a delivery feed roll mounted on the lower of the last mentioned shafts and comprising a pair of spaced roll sections each having an outer surface diminishing in width from the inner end toward the outer end thereof and being substantially complementary in shape to the shape of the surface of the upper roll opposed thereto, a knife, a support therefor, and means carried by the said side members for vertically and laterally adjusting the said support thereby to position the operating portion of the knife between the lower rolls and above the central recessed portion of the lower of the first pair of rolls, and means for driving the said rolls.

8. In a machine of the character described, the combination of an upper and a lower receiving feed roll each diminishing in diameter from the opposite end portions thereof toward the central portion thereof, an upper and a lower delivery feed roll spaced from the former feed rolls, the upper delivery roll diminishing in diameter from the end portions toward the middle thereof and the lower delivery roll comprising a pair of delivery roll sections, each having an outer surface substantially complementary in shape to the surface of the upper delivery roll opposed thereto, a knife support and means for supporting the same with its upper end extending between the sections of the lower delivery roll and the lower receiving feed roll, a knife carried by the knife support and having its cutting portion projecting above the central recessed portion of the lower receiving and delivery rolls, and means for driving the said rolls.

9. In a machine of the character described, the combination of an upper and a lower receiving feed roll each having a concave surface intermediate the ends thereof shaped to engage the top and bottom respectively of the pod of a pea or bean inserted therebetween with its placenta presented downwardly, an upper and a lower delivery feed roll spaced from the former feed rolls, the upper delivery feed roll diminishing in diameter from the end portions thereof toward the middle thereof and the lower delivery feed roll comprising a pair of sections each having an outer surface substantially complementary in shape to the surface of the upper roll opposed thereto and being spaced apart at their inner ends, a vertically extending knife support, and means located below the lower rolls for supporting the same with its upper portion extending between the lower rolls and between the sections of the lower delivery roll, a knife carried by the said knife support and having its cutting portion projecting above the central recessed portion of the lower feed roll and in position to slit the placenta of a pea or bean fed by the aforesaid rolls.

10. In the machine set forth in claim 9, a guide plate extending rearwardly from the knife support between the inner ends of the delivery roll sections.

HORACE ZELL STEWART.